(12) United States Patent
Ogle et al.

(10) Patent No.: US 9,981,424 B2
(45) Date of Patent: May 29, 2018

(54) PROCESS FOR REMOVING EXCESS PASTY MATERIAL JOINING A PLURALITY OF SUBSTRATES

(71) Applicant: Dow Global Technologies LLC, Midland, MI (US)

(72) Inventors: James R. Ogle, Rosharon, TX (US); Jeremy J. Patt, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 347 days.

(21) Appl. No.: 14/425,127

(22) PCT Filed: Mar. 7, 2013

(86) PCT No.: PCT/US2013/029581
§ 371 (c)(1),
(2) Date: Mar. 2, 2015

(87) PCT Pub. No.: WO2014/042677
PCT Pub. Date: Mar. 20, 2014

(65) Prior Publication Data
US 2015/0217511 A1    Aug. 6, 2015

Related U.S. Application Data

(60) Provisional application No. 61/700,406, filed on Sep. 13, 2012.

(51) Int. Cl.
*B08B 1/00* (2006.01)
*B29C 65/00* (2006.01)
(Continued)

(52) U.S. Cl.
CPC .......... *B29C 66/3262* (2013.01); *B08B 1/005* (2013.01); *B28B 1/002* (2013.01);
(Continued)

(58) Field of Classification Search
CPC ...... B26D 2001/002; B26D 2001/0053; B26D 2001/006; B28B 11/18; B28D 1/002; B29C 37/04; B29C 66/3262
See application file for complete search history.

(56) References Cited

U.S. PATENT DOCUMENTS 4,326,325 A * 4/1982 Chambers .............. B23D 79/02
                                                    29/27 C
4,995,286 A    2/1991 Kobayashi et al.
(Continued)

FOREIGN PATENT DOCUMENTS

DE        19918427 A1   10/2000
DE    102007017562 B3 *  9/2008 ............... B25G 3/36

OTHER PUBLICATIONS

Lerchenmueller, A., et al., "Knife for cutting flash, beading or excess material on a welded plastic profile has a low friction coating on the underside to reduce adhesion and material pick up", Oct. 26, 2000, Urban Maschinenbau (Urban GmbH & Co. Maschinebau KG), DE19918427-A1, Machine Translation.
(Continued)

*Primary Examiner* — Katelyn B Whatley
(74) *Attorney, Agent, or Firm* — The Dobrusin Law Firm, P.C.

(57) ABSTRACT

A method comprising: a) contacting an article comprising one or more blades (10), the one or more blades (10) having a leading edge (12) curved upward and separated into prongs (14) by one or more notches (16) in the one or more blades (10), with two or more substrates (20,22) joined by a pasty material overflowing at one or more seams (18), where the one or more notches (16) of the article straddle the one or more seams (18); and b) moving the article or the substrates (20,22) such that the pasty material overflowing at the one or more seams (18) is removed.

20 Claims, 3 Drawing Sheets

(51) Int. Cl.
*B28B 1/00* (2006.01)
*B28B 11/18* (2006.01)
*B29C 37/04* (2006.01)
*B26D 1/00* (2006.01)

(52) U.S. Cl.
CPC .............. *B28B 11/18* (2013.01); *B29C 37/04* (2013.01); *B26D 2001/002* (2013.01); *B26D 2001/006* (2013.01); *B26D 2001/0053* (2013.01)

(56) References Cited

U.S. PATENT DOCUMENTS

| | | |
|---|---|---|
| 2003/0114097 A1 | 6/2003 | Markert et al. |
| 2005/0065240 A1* | 3/2005 | Kyte .................. B65D 83/285 523/218 |
| 2006/0169384 A1 | 8/2006 | Fujita et al. |
| 2012/0138093 A1* | 6/2012 | Sappok ................ B01D 65/02 134/18 |

OTHER PUBLICATIONS

Wahl, C., "Blade for removing joint seams of flooring coatings has cutting edge ground on both sides with off-center edges relative to cross-section perpendicular to longitudinal direction of blade", Sep. 25, 2008, Mozart AG, DE102007017562-B3, Machine Translation.

\* cited by examiner

PROCESS FOR REMOVING EXCESS PASTY MATERIAL JOINING A PLURALITY OF SUBSTRATES

FIELD OF THE INVENTION

The present invention relates generally to a process for scraping excess pasty material from a seam joining two substrates.

BACKGROUND OF THE INVENTION

A diesel particulate filter is a device that removes diesel particulate matter or soot from the exhaust of a diesel engine. Segmented diesel particulate filters are assembled by joining an array of individual segments with an adhesive cement. In an assembly process, the cement is applied to a side surface of a segment, and another segment is pressed into the cement. This is repeated to build up arrays of segments.

When joining the segments, it is desirable to use excess cement to ensure the cement seams are fully filled without air voids. When the segments are joined, the excess cement overflows from the seam as the segments are pressed together. This excess cement must be removed so the cement in each seam is substantially flush to the adjoining segments.

It is known for an operator to use a standard drywall knife or similar conventional scraper to remove excess cement overflows. However, using a standard drywall knife can easily catch a corner of a segment, especially when the faces of the segments are not all aligned in exactly the same plane. If an operator uses a standard drywall knife to scrape the surface, when pressure is applied to the knife, its sharp edge may forcefully contact the brittle corners of segments that are not perfectly aligned with the adjoining segments, causing the corners of the segments to chip and break away. As these corners are fragile, an operator performing the scraping must use caution to adjust the angle of approach and pressure applied to the scraper blade to prevent damage to the segments. It is desirable to implement an automated scraping process; however, since so much care is required to scrape the excess cement, and an operator must visually assess the surface he or she is scraping, it has previously been difficult to automate this scraping process.

Thus, what is needed is a method of scraping excess pasty material, such as cement, from a seam joining two substrates without causing damage to the surfaces of the substrates, particularly to the edges, and also a method of scraping that allows for the scraping process to be automated if desired.

SUMMARY OF THE INVENTION

The present invention relates to a method comprising: a) contacting an article comprising one or more blades, the one or more blades having a leading edge curved upward and separated into prongs by one or more notches in the one or more blades, with two or more substrates joined by a pasty material overflowing at one or more seams, where the one or more notches of the article straddle the one or more seams; and b) moving the article or the substrate such that the pasty material overflowing at the seam is removed.

The invention may comprise one or more notches along the leading edge of one or more blades. Exemplary notches include forming a v-shape, semicircle shape, partial polygon shape, multiple angular shape, and the like. Preferably, the notches are a v-shape. In a preferred embodiment, the one or more blades comprise a material with a sufficient modulus to remove pasty material and sufficient flex modulus to bend when scraping along an uneven surface of the substrate. In some embodiments, it is preferred to allow the prongs to flex independently of each other to further facilitate scraping along an uneven surface. The article may comprise a handle for guiding the article during scraping. The article may be connected to an automated device to facilitate automated scraping. This automated device preferably allows for motion with at least two degrees of freedom.

The methods of the invention allow for the scraping of excess pasty material from the seams joining the substrates without damaging the substrates. As the article moves along the seams, the excess material is scraped away by the notch in the blade. The curved upward leading edge significantly reduces the risk of catching a corner of an uneven portion of the segments. The one or more blades have sufficient flex modulus and the prongs of the blades may flex independently to adjust when moving over uneven or non-coincident segments, which improves scraping and reduces damage to the substrates. Because an operator does not have to carefully assess the surface to be scraped, the methods of the invention allow the article to be used with an automated device.

DETAILED DESCRIPTION

Figure 1:
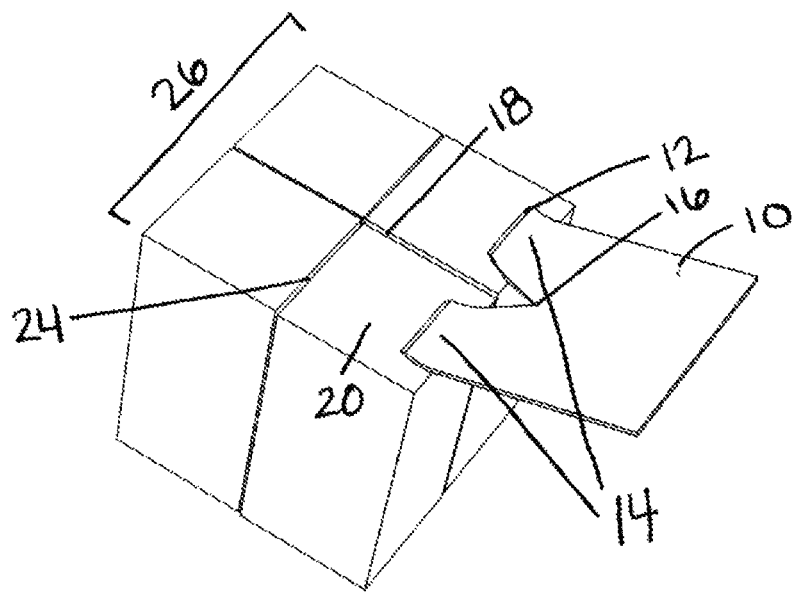
FIG. 1 exemplifies the process of approaching a seam to scrape excess pasty material according to the invention.

The explanations and illustrations presented herein are intended to acquaint others skilled in the art with the invention, its principles, and its practical application. The specific embodiments of the present invention as set forth are not intended as being exhaustive or limiting of the invention. The scope of the invention should be determined not with reference to the above description, but should be determined with reference to the appended claims, along with the full scope of equivalents to which such claims are entitled. The disclosures of all articles and references, including patent applications and publications, are incorporated by reference. Other combinations are also possible as will be gleaned from the following claims, which are also hereby incorporated by reference into this written description. One or more as used herein means that at least one, or more than one, of the recited components may be used as disclosed.

The invention relates to a method of removing excess pasty material following the assembly of a plurality of substrates. Pasty material means a mixture of a soft or malleable consistency. The pasty material preferably has adhesive properties and may be abrasive. A substrate is a substance or material upon which a different material is deposited or adhered. Exemplary substrates include diesel particulate filters, refractory bricks, ceramic tiles, and the like. These substrates are preferably ceramic diesel particulate filter segments assembled into an array and bonded together using a pasty material, such as an adhesive cement, of consistent thickness. Consistent thickness means that the pasty material layers disposed between two adjacent substrates exhibit a thickness with a specified range and the variation of the thickness along the bonded adjacent substrates is within a specified range of variation of the thickness. The acceptable thickness of pasty material may be impacted by the size, number, and use of the substrates. To ensure that substrates are joined with pasty material free of air voids, it is desirable to dispense excess pasty material that overflows at the seams as the substrates are pressed together. A seam means a junction between the two or more substrates to form a relatively level surface, where relatively level means a difference in height between the non-coincident faces of the substrates of about 4 mm or less. The process of the invention utilizes a notched scraping article to remove the excess pasty material overflowing at the seams so the cement in each seam is substantially flush with the adjoining substrate. Substantially flush means within acceptable tolerances for the particular structure, for example, within about 0.5 mm or less. Notched means the article has a cut out portion along the leading edge of the scraper blade.

It is contemplated that the present invention can be used in any application requiring removal of overflowing pasty material from a seam joining two substrates. Examples of applications include removing excess pasty material along adjacent ceramic filter segments, refractory liner bricks, ceramic tiles, layered ceramic assemblies and the like.

In a preferred embodiment, the scraping article is used to remove excess adhesive cement from seams joining diesel particulate filter segments. Diesel particulate filter segments mean ceramic structures having in one direction a plurality of walls defining flow passages. The diesel particulate filter segments have two opposing ends with the flow passages open at one or both ends. In a preferred embodiment, each passage is open at only one end and on each end each open flow passage is surrounded by closed flow passages. Thus, each diesel particulate filter segment contains two opposing faces on each end of the segment. Perpendicular to the plane of both ends is a plurality of flat surfaces on the outside of each diesel particulate filter segment. The flat surfaces are adapted to fit to adjacent flat surfaces of other diesel particulate filter segments and to be bonded to such adjacent surfaces using a pasty material. Exemplary pasty materials include any material that is of soft or malleable consistency disposed between two substrates, for example adhesive cement, sealer, putties, caulks, or glues. Most preferably, the pasty material is an abrasive adhesive cement. The cross sectional shape of the segments can be any cross sectional shape that facilitates assembly of an array of diesel particulate filter segments. Preferably, each surface of each segment is flat and capable of being placed adjacent to a surface of another diesel particulate filter segment such that the surfaces match in size and surface area. However, it is possible that the diesel particulate filter segments, when assembled, are slightly uneven, creating a stair step, or non-coincident faces of segments.

In one method for assembling the arrays of diesel particulate filter segments, the adhesive cement is applied to the side surface of a segment, and another segment is pressed into the cement. This is repeated to build up single stacks of segments. Then multiple stacks are joined with adhesive cement to form the final assembly of a segmented diesel particulate filter. As the segments are joined, the cement spreads to fill the seam. To ensure that the cement seams are fully filled without air voids, it is desirable to dispense excess cement. Any excess cement then overflows out of the seam, and this excess cement must be removed.

The present invention is a method for removing excess pasty material joining two or more substrates overflowing at one or more seams. This involves moving an article along one or more of the seams to remove the overflowing pasty material. In an alternate embodiment, the article can remain stationary while the substrates move along the notches of the article to remove the excess pasty material from the seams. The article comprises one or more blades with a leading edge curved upward and separated into prongs by one or more notches in the leading edge. The notches straddle the seams, and the article or the substrates are moved such that the pasty material overflowing at the one or more seams is removed. The present invention may also comprise any of the following elements individually or in any combination: one or more seams that are the junction between the two or more substrates to form a relatively level surface; a leading edge curved upward to form an arcuate shape; a leading edge curved upward to form a multi-radius shape; one or more notches in a v-shape, semicircle shape, partial polygon shape, multiple angular shape, or combination thereof; one or more notches with at least one beveled edge; one or more notches with at least two beveled edges; one or more notches wherein the widths of the notches along the leading edge of the one or more blades are wider than the width of the seam; one or more blades with two or more notches; one or more blades comprising one or more of metal, metal alloys, plastics, ceramics, composites, or combination thereof with sufficient modulus to remove the pasty material and sufficient flex modulus to bend when scraping along an uneven surface; one or more blades coated with a coating that improves abrasion resistance or improves lubricity of the blades along the surface of the substrates; one or more blades coated with polyurethane coating, abrasion resistant coating, ceramic overlay, or combination thereof; one or more blades exhibiting a scraper deflection of about 1 mm or greater; the prongs of the one or more blades flexing independently to facilitate scraping of the pasty material overflowing at the one or more seams between uneven segments; a handle for guiding the article during scraping; a pasty material comprising an adhesive, sealer, putty, caulk, or glue; substrates comprising a ceramic; substrates joined to form an array; an array forming a diesel particulate filter; a connection to an automated device to facilitate automated scraping; an automated device comprising one or more robots, pneumatically actuated slides, linear motion systems, rotary motions systems, or combination thereof; an automated device comprising one or more pneumatic, hydraulic, electromechanical driven motion systems, or combination thereof; an automated device exhibiting from 1 to 6 axes of movement; an automated device having an article holding system which functions to hold the article to facilitate scraping the excess pasty material under direction from the automated device; an article holding system that allows for at least two degrees of freedom; an article holding system that is a spring loaded arm; an article holding system having hinged actuation at the blade to provide rotation; an automated device providing motion of the blade from an end effector; an angle of approach of the article to the substrate at about 10 degrees to about 45 degrees; a method of scraping wherein the article moves along the substrates to remove excess pasty material from the one or more seams; or a method of scraping wherein the article is stationary and the two or more substrates move along the article to remove excess pasty material from the one or more seams.

The one or more blades of the article can be formed from any material with sufficient modulus to remove the pasty material and sufficient flex modulus to bend when scraping along an uneven surface. Exemplary blade materials include metal, metal alloys, plastics, ceramics, composites, and the like. Preferably the one or more blades are formed of aluminum, stainless steel, titanium, or alloys known in the art of cutlery. The blades preferably exhibit a consistent thickness, but it is also possible that the blades be tapered so, for example, the blades are thinner at the leading edge than at the body of the blade. The blades preferably exhibit a scraper deflection adequate for the scraper to conform to the part while providing adequate contact force to remove the pasty material. This is a function of the material properties like modulus, and blade geometry, thickness and shape. The scraper deflection is defined as displacement of the scraper's leading edge from its rest (non-flexed) position. Preferably, the scraper deflection at a given application pressure is about 1 mm or greater, more preferably about 5 mm or greater, and most preferably about 10 mm or greater. Preferably, the scraper deflection at a given application pressure is about 100 mm or less, more preferably about 50 mm or less, and most preferably about 30 mm or less. The scraper application pressure applied during scraping is chosen such that the excess pasty material is removed without damaging the outer surface of the substrate. The scraper application pressure is defined as force per unit length of the scraper's width, in lbf per inch. Preferably, the scraper application pressure is about 1 lbf/in or greater, more preferably about 2 lbf/in or greater, and most preferably about 4 lbf/in or greater. Preferably, the scraper application pressure is about 50 lbf/in or less, more preferably about 30 lbf/in or less, and most preferably about 15 lbf/in or less. The blades may also be coated with a coating that functions to improve abrasion resistance or improve lubricity of the blades along the surface of the substrate. Abrasion resistance means resisting processes of damaging a surface, such as by scuffing, scratching, wearing down, marring or rubbing away. A blade coating with abrasion resistance functions to allow the blades to scrape away abrasive pasty material and extend the life of the blades before the one or more blades must be replaced as compared with a blade without an abrasion resistant coating. A coating to improve lubricity functions to allow the blades to slide along the surface of the substrate. Exemplary coatings include polyurethane coatings, abrasion resistant coatings, ceramic overlays, diamond like carbon, and the like. Preferably the blade exhibits an abrasion resistance such that it can operate in service for several days before replacement becomes necessary.

The upward curvature of the blades functions to avoid catching an edge of the substrate, allowing the one or more blades to travel across non-coincident faces of the joined segments. The curvature must be sufficiently upward to avoid the leading edge of the blades contacting an edge of an uneven substrate. The geometry of curvature should be adequate to ensure that the leading edge of the scraper will not contact a substrate. Preferably the leading edge is at least 1 mm above the surface being scraped, more preferably at least about 3 mm above the surface, and most preferably at least about 5 mm above the surface. The minimum radius of curvature of the leading edge should be adequate to prevent damage to substrate portions that protrude above the surface. Preferably the minimum radius of curvature is at least about 3 mm, more preferably at least about 6 mm, and most preferably at least about 9 mm. The curve may form an arcuate shape or a multi-radius shape, where arcuate means a curve that is shaped like a portion of a circumference of a circle and multi-radius means a curve that is non-circular or having a changing radius, such as shaped like a partial ellipsis or partial parabola.

The one or more notches in the one or more blades function to straddle the one or more seams and scrape away the excess pasty material. To accomplish this scraping, sufficient pressure is applied to the blades so the blades flex and the portion of the notches furthest from the leading edge of the blades is in close contact with the seams and surfaces of the substrates. The notches can be in any shape that allows for efficient scraping to remove the excess pasty material when applied and pushed along the seams while significantly reducing damage to the substrates. Exemplary shapes of notches include a v-shape, semicircular shape, partial polygon shape, multiple angular shape, or the like. In a preferred embodiment, the notch may take a v-shape. A multiple angular shape means a shape with multiple angles but does not necessarily have straight sides. Preferably, the width of the notches along the leading edge is wider than the width of the seams to scrape away the excess material. The height of the notches, which is the measured as the distance between the leading edge and the point of the notch furthest from the leading edge, may be dependent upon the material of the blade and the desired flex in the prongs. It is contemplated that the blade may have two or more notches to scrape two or more seams in an array of segments or substrates. Preferably, each of these two or more notches forms the same shape; however, it is contemplated that the notch shapes may vary for each notch. The edge along the notch may be of a uniform thickness with the rest of the blade. However, it is also contemplated that at least one side of the blade at the notch has a beveled edge to increase sharpness and create a cleaner scrape. It is also possible to have both sides of the blade at the notch beveled to further increase sharpness of the notch.

The one or more notches in the leading edge of the one or more blades form two or more prongs. Preferably, these prongs flex when pressure is applied to the blades against the substrates. The flexure of the prongs may be dependent upon the material of the blades. Even more preferably, the prongs flex independently of each other to move along the surfaces of each substrate. This allows each prong to continue to move along the surfaces of the substrates uninterrupted, even if one prong encounters non-coincident segments while scraping.

The article may have a handle. This handle may function to guide the article during scraping. It is contemplated that the handle may enable an operator to use the article when manually scraping the substrates. It is also contemplated that the handle can fit into a receiver for an automated system for automated scraping. The shape of the handle may be any shape that can manually be used by an operator or grasped and controlled by an automated device. Exemplary handles include straight handles or d-shape handles. The straight handle may have a rounded end or a flat end and may further comprise a pistol grip. The straight handle may be shaped to fit into a receiver or a holder of an automated system. Exemplary materials include plastic, wood, metal, metal alloy and the like. The handle may include a surface to facilitate gripping. For example, the surface may be a rubber, a tacky material, or a texture to facilitate gripping by the operator or automated device.

The article may be connected to an automated device to facilitate automated scraping. An automated device is a device that performs a function without requiring human intervention. An automated device functions to facilitate scraping with minimal human operator control over the device, preferably to optimize productivity. Any automated device which performs the function may be utilized. Exemplary automated devices include robots, pneumatically actuated slides, linear motion systems, rotary motions systems and the like. It is contemplated that the automated device may exhibit between 1 and 6 axes of movement. Preferably, the automated device is a robot. Most preferably, the robot is a 6 axis robot. Exemplary motion systems for the automated device include pneumatic, hydraulic, electromechanical driven motion systems and the like. The automated device may have an article holding system which functions to hold the article to facilitate scraping the excess pasty material under direction from the automated device. Preferably, this article holding system allows for at least two degrees of freedom. Degrees of freedom allow for the movement or rotation of the article holding system and the article. This movement may be up and down, left to right, or forward and backward. Rotation can also be tilting forward and backward, turning left and right, or tilting side to side. Such degrees of freedom may, for example, come from a spring loaded arm in the article holding system, hinged actuation at the blade to provide rotation, or motion from the end effector of the automated device. The automated device may include another system for holding the substrate while the surface is being scraped. A substrate holding system functions to hold the substrate, thereby allowing the article to scrape the excess pasty material from the seam. This system can hold the substrate in place so the article can move along the seam. In another embodiment, it is contemplated that the holding system moves the substrates along the notches of a stationary article of the invention. Such system that can be one which clamps along the ends of the substrates, a vacuum, pneumatic, hydraulic or servoelectric gripping systems, and the like. Any substrate holding system should not damage the substrate surfaces or ends. Preferably the substrate holding system exerts about 1.0 MPa or less of pressure on the segments and more preferably about 0.2 MPa or less.

When using the article to scrape away pasty material, the pasty material can be dry, partially dried, or wet. To achieve the cleanest removal of the excess material and reduce the need to clean the notch and blade of the article, it is most preferred to dry the pasty material prior to scraping. Multiple passes of scraping with the article can also be conducted to achieve the desired removal of the pasty material. Multiple passes of scraping with the article can be conducted at different stages of the pasty material drying process. For example, preliminary scrapes using the article can be performed when the pasty material is wet or partially wet to remove some of the pasty material and additional scraping can be performed after the pasty material has dried. The scraping process may be followed by any process that can remove excess pasty material once it has dried. An example of a removal process is by sanding.

The angle of approach of the blade to the substrate functions to influence the flex of the blade to keep the notch in close contact with the seam and the substrates and allow for efficient scraping. For example, if the body of the blade is parallel to the substrate upon approach, there will be minimal flexion of the blade. However, approaching the substrate at a different angle would require the blade to flex more so the notch is in close contact with the seam. To achieve this flex, more pressure must also be exerted upon the blade. To efficiently remove the excess material, it is preferred to approach the substrate with the blade of the article at an angle of about 5 degrees or greater, and more preferably at an angle of 10 degrees or greater. Preferably, the angle of approach of the blade to the substrate is 85 degrees or less, and more preferably at an angle of 45 degrees or less. The pressure applied to the article on the substrate is another factor influencing the flex of the blade. Preferably sufficient pressure must be applied to keep the notch in close contact with the seam and substrates for efficient scraping. The amount of pressure on the blade against the substrate required to facilitate the scraping is dependent upon the flex properties of the material of the blade and the angle of approach.

Figure 2:
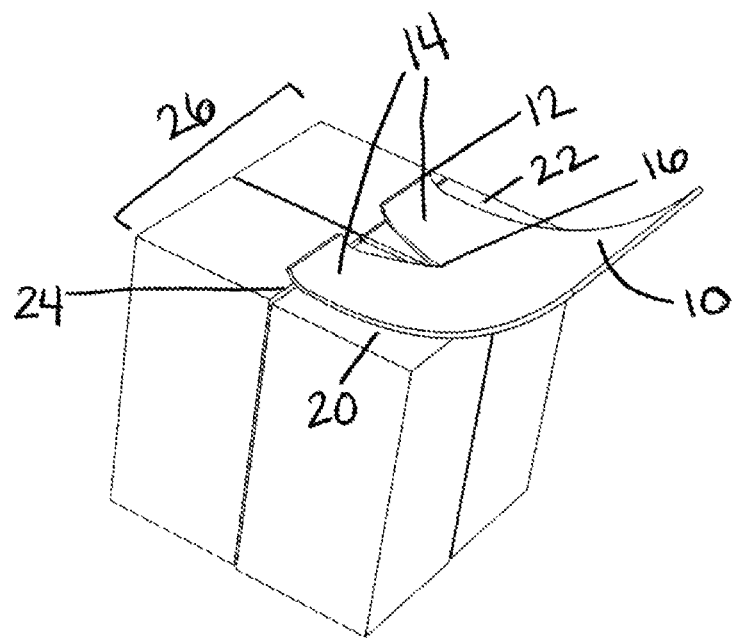
FIG. 2 exemplifies the process of scraping pasty material from a seam and approaching a non-coincident face of an adjacent substrate according to the invention.

One embodiment of the invention is illustrated in FIGS. 1 and 2 wherein the steps demonstrate the approach of the scraping article to the substrate and movement along the substrates to remove the excess pasty material at the seam. Shown is a blade 10 having a leading edge 12 that is curved upward and separated into prongs 14 by a notch 16. As the blade 10 approaches a first substrate 20 and a second substrate 22, which are parts of the array 26 and joined by a seam 18, the blade 10 is pressed against the first substrate 20 and second substrate 22, with the notch 16 straddling the seam 18. The blade 10 flexes upon contact with the first substrate 20 and second substrate 22 when pressure is applied, as is seen in FIG. 2. The notch 16 is moved along the seam 18 to remove excess pasty material (not shown). The upward-curved leading edge 12 allows the blade to ride over a stair stepped or non-coincident area 24 without catching on and damaging the corner of the substrate. The prongs 14 can flex independently so one prong can travel over the non-coincident area 24 without disrupting the scraping along the other prong.

Figure 3:
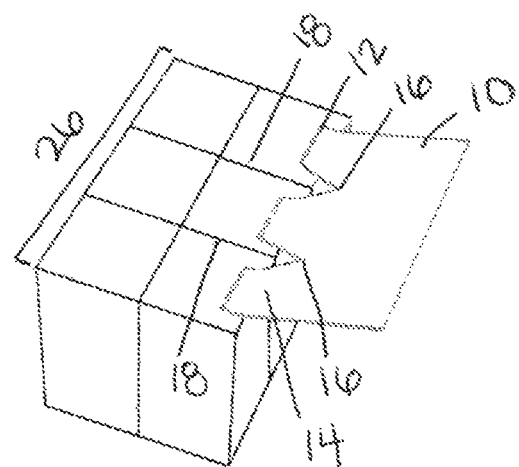
FIG. 3 exemplifies a method of scraping with two notches in the blade.

Another embodiment of the invention is illustrated in FIG. 3. This shows an array 26 of substrates and two seams 18 requiring scraping. The blade 10 as shown has two notches 16 in the leading edge 12, creating three prongs 14.

Figure 4:
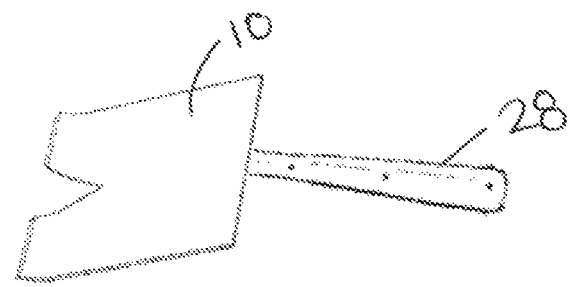
FIG. 4 exemplifies a method of scraping using a handle.

FIG. 4 shows the blade 10 attached to an exemplary handle 28. The handle 28 can be used by an operator to scrape the seam manually, or the handle 28 can be inserted into a receiver in an automated device for automated scraping.

Figure 5:
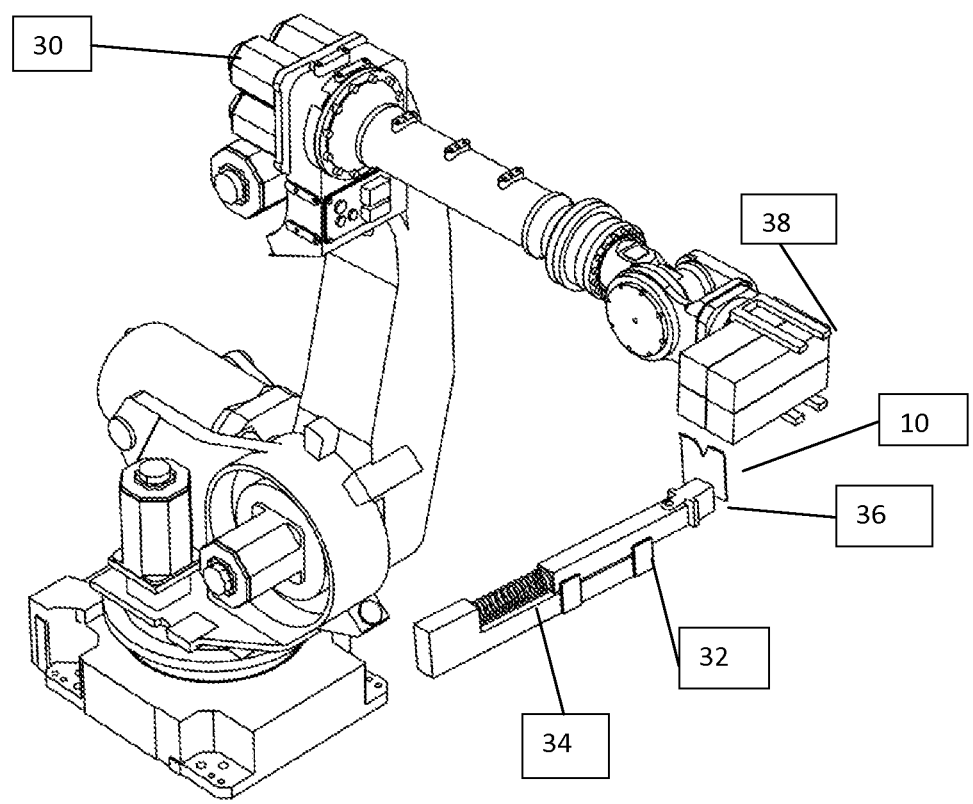
FIG. 5 exemplifies a method of scraping using an automated device.

FIG. 5 is an exemplary method of scraping using an automated device 30. The automated device 30 has an article holding system 32 which includes a spring loaded arm 34. This spring loaded arm 34 provides one degree of freedom within the system. At the blade 10, the hinged actuation 36 provides a second degree of freedom. Also illustrated is an end effector 38. FIG. 5 shows a six axis robot 30 holding the substrate 20 in an end effector 38. The blade 10 is mounted on a spring-loaded linear slide 34, with a pivoting head 36 for the scraper blade 10.

Parts by weight as used herein refers to 100 parts by weight of the composition specifically referred to. Any numerical values recited in the above application include all values from the lower value to the upper value in increments of one unit provided that there is a separation of at least 2 units between any lower value and any higher value. As an example, if it is stated that the amount of a component or a value of a process variable such as, for example, temperature, pressure, time and the like is, for example, from 1 to 90, preferably from 20 to 80, more preferably from 30 to 70, it is intended that values such as 15 to 85, 22 to 68, 43 to 51, 30 to 32, etc. are expressly enumerated in this specification. For values which are less than one, one unit is considered to be 0.0001, 0.001, 0.01, or 0.1 as appropriate. These are only examples of what is specifically intended and all possible combinations of numerical values between the lowest value, and the highest value enumerated are to be expressly stated in this application in a similar manner. Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints. The term "consisting essentially of" to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist essentially of the elements, ingredients, components or steps. Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

The invention claimed is:

1. A method comprising:
   a) contacting an article comprising one or more blades, the one or more blades having a leading edge curved upward and separated into prongs by one or more notches in the blade, with two or more substrates joined by a pasty material overflowing at one or more seams, where the one or more notches of the article straddle the one or more seams and where the leading edge curved upward is free of contact with the two or more substrates; and
   b) moving the article or the two or more substrates such that the pasty material overflowing at the one or more seams is removed;
      wherein the two or more substrates are joined to form an array, and wherein the array forms a diesel particulate filter; and
      wherein the leading edge curved upward allows the one or more blades to move along the two or more substrates without catching on or damaging a corner of at least one of the substrates.

2. A method according to claim 1 wherein the one or more seams are a junction between the two or more substrates to form a relatively level surface.

3. A method according to claim 1 wherein the one or more notches are cut out portions along the leading edge of the one or more blades which comprise one or more of a v-shape, semicircle shape, partial polygon shape, multiple angular shape or combination thereof.

4. A method according to claim 3 wherein the one or more notches in the one or more blades have at least one beveled edge.

5. A method according to claim 1 wherein the width of the one or more notches at the leading edge of the one or more blades is wider than the width of the seam.

6. A method according to claim 1 wherein the one or more blades have two or more notches.

7. A method according to claim 1 wherein the one or more blades comprise one or more of metal, metal alloys, plastics, ceramics, composites, or combination thereof with sufficient modulus to remove the pasty material and sufficient flex modulus to bend when scraping along an uneven surface.

8. A method according to claim 1 wherein the one or more blades are coated with a coating that improves abrasion resistance or improves lubricity of the blades along the surface of the two or more substrates.

9. A method according to claim 1 wherein the prongs of the one or more blades flex independently to facilitate scraping of the pasty material overflowing at the one or more seams between uneven segments.

10. A method according to claim 1 wherein the two or more substrates comprise a ceramic.

11. A method according to claim 1 wherein the article is connected to an automated device to facilitate automating scraping.

12. A method according to claim 11 wherein the automated device exhibits from 1 to 6 axes of movement.

13. A method according to claim 11 wherein the automated device has an article holding system which functions to hold the article to facilitate scraping the excess pasty material under direction from the automated device.

14. A method according to claim 13 wherein the article holding system is a spring loaded arm.

15. A method according to claim 1 wherein the angle of approach of the article to the two or more substrates is about 10 degrees to about 85 degrees.

16. A method according to claim 1 wherein the leading edge of the one or more blades curved upward forms art arcuate shape.

17. A method according to claim 1 wherein the pasty material is an adhesive cement.

18. A method according to claim 1 wherein the article includes a handle for guiding the article during scraping.

19. A method according to claim 1 wherein the leading edge is about 1 mm or greater above a surface being scraped.

20. A method according to claim 1 wherein the leading edge has a minimum radius of curvature of about 3 mm or greater.

* * * * *